United States Patent
Nakazawa et al.

(10) Patent No.: US 8,748,838 B2
(45) Date of Patent: Jun. 10, 2014

(54) BODY SELF-SHIELDING BACKGROUND COMPENSATION FOR CONTAMINATION MONITORS BASED ON ANTHROPOMETRICS

(75) Inventors: Dante Nakazawa, West Haven, CT (US); James Zickefoose, Coventry, CT (US); Lloyd Cass, Toronto (CA); Gregory Bogorodzki, Richmond Hill (CA); Dominique Rothan, Aigremont (FR); Timothy Spillane, Quincy, MA (US)

(73) Assignee: Canberra Industries, Inc., Meriden, CT (US)

( * ) Notice: Subject to any disclaimer, the term of this patent is extended or adjusted under 35 U.S.C. 154(b) by 185 days.

(21) Appl. No.: 13/297,379

(22) Filed: Nov. 16, 2011

(65) Prior Publication Data
US 2013/0124098 A1    May 16, 2013

(51) Int. Cl.
*G01T 1/00*    (2006.01)
(52) U.S. Cl.
USPC .................................................. 250/390.03
(58) Field of Classification Search
USPC .................................................. 250/390.03
See application file for complete search history.

(56) References Cited

U.S. PATENT DOCUMENTS

| | | | | |
|---|---|---|---|---|
| 3,376,417 A | * | 4/1968 | Keck et al. | 250/367 |
| 4,352,019 A | * | 9/1982 | Pollard | 250/394 |
| 4,591,720 A | * | 5/1986 | Fuji et al. | 250/362 |
| 4,731,536 A | * | 3/1988 | Rische et al. | 250/394 |
| 5,939,723 A | * | 8/1999 | Keck | 250/363.01 |
| 2012/0161265 A1 | * | 6/2012 | Hora et al. | 257/429 |
| 2012/0176246 A1 | * | 7/2012 | Yanagishima et al. | 340/600 |

FOREIGN PATENT DOCUMENTS

JP    2006106010 A  *  4/2006
WO    WO 2010107383 A1  *  9/2010

OTHER PUBLICATIONS

Radiation Monitoring Systems, 2004, Fuji Electric Review, vol. 50, pp. 100-131.*

* cited by examiner

*Primary Examiner* — Christine Sung
(74) *Attorney, Agent, or Firm* — David W. Carstens; Kevin M. Klughart; Carstens & Cahoon, LLP

(57) ABSTRACT

A system and method for correcting, based on a monitored subject's height and thickness, the net count rate value of a whole-body surface contamination monitoring device. The device includes a height detection means for determining the height of a subject being monitored, and a thickness detection means for determining the thickness of at least a portion of the body of the subject being monitored. The net count rate is based on site calibration factor data and self-shielding factor data, wherein both types of factor data consider the determined height and thickness.

10 Claims, 5 Drawing Sheets

BODY SELF-SHIELDING BACKGROUND COMPENSATION FOR CONTAMINATION MONITORS BASED ON ANTHROPOMETRICS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to radiation detection and, more specifically, to methods for improving the accuracy of radiation contamination monitors used to assess surface contamination on the body of workers.

2. Description of Related Art Including Information Disclosed Under 37 CFR 1.97 and 1.98

Given the potentially harmful physiological effects from exposure to radiation, it is important to regularly monitor radiation workers, and other workers with potential whole-body exposure to radioactive materials, to assess potential contamination that might be present on or within the worker's body. Whole-body ionizing radiation-monitoring devices, such as that depicted in FIG. 1, have been developed to automate and to improve the efficiency and effectiveness of this monitoring process. As depicted, the monitoring portal (102) utilizes an array of radiation detectors (104), a number of which detect gamma radiation. The array (104) allows a radiation worker (106) to enter the device and stand with one side of the worker's body positioned before the detector array (104). An arm, side leg, and hand monitoring array (108) is also present in the depiction. As shown, the worker is facing the detector array (104), with his or her right hand and arm inserted in the array (108). Detectors (110) on the base of the monitoring portal detect contamination that may be present on the worker's feet. Thus, the worker's anterior surface, right arm, right outside leg, and feet are being monitored for surface contamination. Once this anterior surface monitoring is complete, the worker turns with his or her posterior surface against the detector array (104), with his or her left hand and arm inserted in the array (108). Once the posterior surface has been surveyed, the measurement data is processed by an automated computing device, which logs the measurements and signals an alarm if necessary.

On-site calibration of such detection devices is crucial to the accuracy of its radiation measurements. As is commonly understood, gamma-ray background radiation is always present at levels that vary from physical location to location. To compensate for this background radiation variability, an on-site calibration routine utilizing one or more workers—who are known not to be contaminated—is typically performed to determine the existing background radiation properties and their effects on occupant self-shielding. The predetermined calibration factors to calculate the effects caused by the fact that the worker's body has a shielding effect on the detector array (104) may not fully describe the self-shielding on-site.

When standing in front of the detector array (104), the worker's body will absorb and/or scatter a certain amount of the gamma background radiation. This causes the resulting net count to be different than the actual count present on the worker's body, because the background radiation (though no longer being detected at the same rate as before the worker entered the device) is still being deducted from the measured counts. Thus, the sensitivity and accuracy of the device is negatively impacted by this effect.

A common method currently employed in an attempt to deal with this problem is to apply a single correction factor to the measurement that compensates for this whole-body shielding effect upon the detectors. Essentially, a group of workers who are known not to be contaminated is surveyed and an average "standard" worker profile is obtained. This "standard" worker profile is intended to compensate for the average shielding effect that a body has on the measured background radiation. Thus, a single correction factor is applied to the count rate determinations. While this is an improvement over previous methods of count rate determinations, it still does not account for the effects of varying body shapes and sizes. For example, a worker with a slight frame (less shielding than average) will experience a net count rate greater than actual while a worker with a heavier frame (more shielding than average) will experience a net count rate less than actual.

Moreover, the average "standard" worker profile does not compensate for the effects that various body heights and thicknesses have on the sensitivity and accuracy of the various sections of the detector array. For example, to increase sensitivity in the detectors, various detectors within the array will be grouped together to form a larger effective scintillating volume. Therefore, a worker that is shorter than average or that has a slight frame will leave certain detector groupings exposed to (or unshielded from) the background counts. Thus, while the average "standard" worker profile compensation assumes that these certain detector groupings should be experiencing some shielding, the resulting net count rate will be greater than actual. Conversely, a worker that is much taller than average or that has a much heavier frame will provide more shielding than average in a greater number of detector groupings. Because shielding for this worker is more than average, the resulting net count rate will be less than actual.

Further still, this average "standard" worker profile does not account for varying thickness of individual workers. For example, a worker with an athletic build (small waist and gut area, but large upper body) will provide more shielding to portions of the detector array near the chest area as opposed to those near the waist area. Thus, the portions of the detector array near the chest area, in reality, require a different correction factor than those near the worker's waist. This requirement is reversed in the situation with a worker having an excessively large midsection and relatively small upper body. Accordingly, the current "one-size-fits-all" approach does not adequately compensate for varying worker bodies.

Still others have attempted to compensate for this shielding effect by considering the worker's body weight in determining a correction factor. While this may give some indication as to the worker's density, it is no more accurate because it fails to consider the overall density distribution. Different types of tissue (muscle, adipose, etc.) have different densities and elemental compositions, affecting their absorption and scattering properties. Again, a worker with an athletic build may carry all of his or her weight in the chest region, yet would weigh the same as (or even more than) an obese worker carrying all of his or her weight in the gut. Moreover, a 183 cm tall individual that weighs 80 kg will have a different density distribution than a 152 cm tall individual of the same weight. Again, the same poorly-corrected-for shielding problems occur. What is needed is a more accurate method of correcting for the self-shielding effect that varying body sizes have upon whole-body detector arrays.

BRIEF SUMMARY OF THE INVENTION

One embodiment disclosed herein is a whole-body surface contamination monitoring system, the system comprising: a plurality of gamma radiation detectors, the detectors arranged in a detector array for radioisotope surface-contamination monitoring of at least a portion of the body of a user; and a computing device, the computing device operable to compute a net count rate based upon the output of the gamma radiation detectors, wherein the net count rate calculation includes a self-shielding correction factor that includes a height value and a thickness value, the height value and the thickness value representing physical characteristics of the monitored portion of the body of the user.

Another embodiment provides a computerized method of compensating for body self-shielding effects on background radiation counts during whole-body surface contamination monitor system operation, the method steps comprising: with at least one computing device: accepting the outputs from a plurality of gamma radiation detectors arranged in a detector array; accepting a height value and a thickness value, the height value and the thickness value each representing a physical characteristic of the monitored portion of the body of a user; calculating a self-shielding factor, the self-shielding factor including the height value and the thickness value; and calculating a net count rate, the net count rate including the self-shielding factor calculation.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein.

Figure 1:
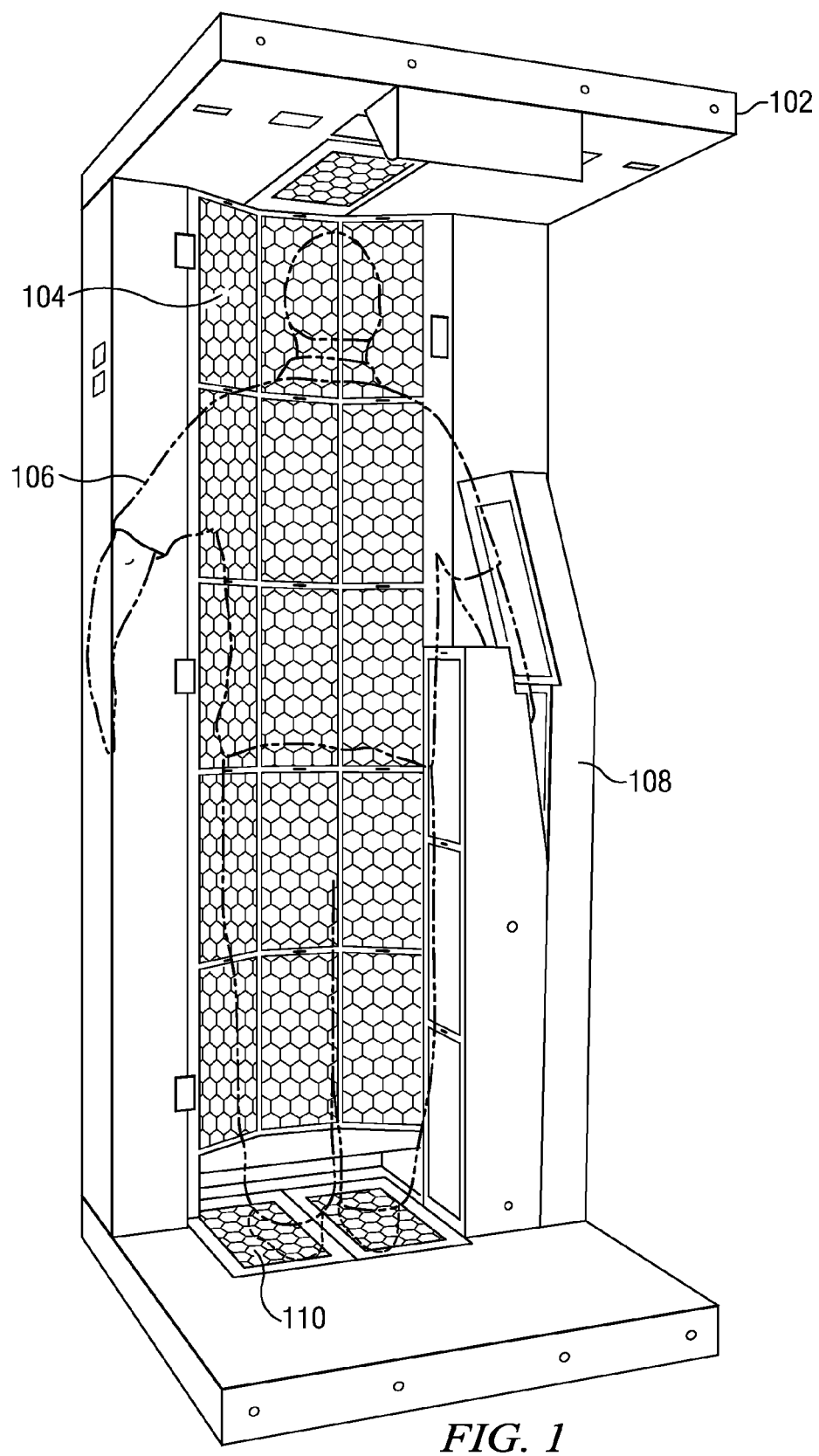
FIG. 1 is a depiction of a typical whole-body radiation monitoring device, with a radiation worker standing therein.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood. (58,266).

DETAILED DESCRIPTION OF THE INVENTION

As used herein "computing device" means any computer processing device capable of executing program instructions stored on a computer readable medium. As used herein "computer readable medium" means any tangible portable or fixed RAM or ROM device, such as portable flash memory, a CDROM, a DVDROM, embedded RAM or ROM integrated circuit devices, or the like.

Figure 2A:
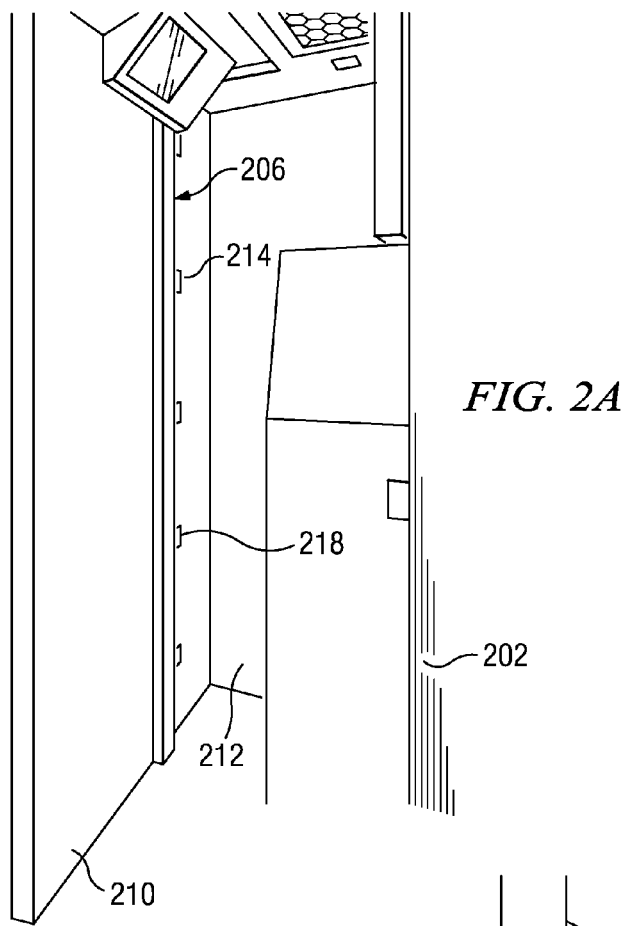
FIG. 2A is a depiction of a portion of an embodiment of the invention disclosed herein, drawing the reader's attention to portions of the automatic thickness sensing device.

FIG. 2 depicts an embodiment of a whole-body surface contamination monitoring device (202) incorporating the inventive aspects disclosed herein. As can be seen in FIG. 2A, a vertical panel (210) is added to enclose the area in which the user (radiation worker) stands (212) and to provide additional shielding from external radiation fields. This panel (210) provides support for the overall device structure (202) as well as the thickness sensor (206).

In the present embodiment, the thickness sensor (206) utilizes photosensor device technology to determine the body thickness of the user without physically contacting the user. This can be accomplished in several ways, depending on the type of photosensor chosen. For example, a first embodiment employs an infrared reflectivity device wherein the photo-detector member measures the reflectivity of light emitted from the photo-emitter member. In such a sensor, the distance between the object being sensed and the photosensor will be determined by the amount of reflectivity. Other photosensors utilize time-of-flight detection, wherein the speed of light (a known constant) may be used to determine distance to an object based on the amount of time it takes for the emitted reflected beam to be detected by the photo-detector member. Still others utilize angular detection, wherein the return angle of the reflected light determines the distance between the photosensor and the detected object. In another embodiment, an ultrasonic distance detection device that utilizes time-of-flight determinations with reflected sound as opposed to light. One of ordinary skill in the art will understand and appreciate that the operational theory and control design of these and other similar distance determination means is well known in the industry and does not serve to limit the scope of the claims herein.

The thickness sensor (206) is first calibrated without a user standing in the device (202). This causes the thickness sensor (206) control circuitry to return a value representing the distance from the sensor face to the detector array panels (204). When a user steps into the device (202) to begin the monitoring process, he or she contacts the detector array (204) and the thickness sensor (206) performs another measurement, returning a value representing the distance from the sensor face to the side of the user that is opposite the side contacting the detector array. Thus, by subtracting the value representing the distance to the user from the value representing the distance to the detector array, it is possible to approximate the thickness of the user.

In the present embodiment, a single thickness sensor (206) is utilized at a point along the anteroposterior axis of a user of average height, slightly higher than the midpoint. In this position, the thickness sensor (206) is exposed to the lower abdomen (or stomach area) of the user, which, on average, tends to be the thickest body portion. This thickness sensor may be fixed in a predetermined position within the device (202), or may be moveable to allow the sensor to be placed in the optimum position for the given worker population that the device (202) is intended to service. In another embodiment, an array of thickness sensors (206, 214, and 218) is utilized to determine thickness values at different points along the anteroposterior axis of the user. Thus, the system may utilize an average of these multiple thickness values in subsequent correction calculations, or may apply the measured thickness value to the correction calculations for measurements obtained at each respective area of the detector array. In yet another embodiment, a mechanical means may be utilized (for example, a tape measure or a caliper gauge) to determine the user's thickness, which may then be manually entered into the computing device.

Figure 2B:
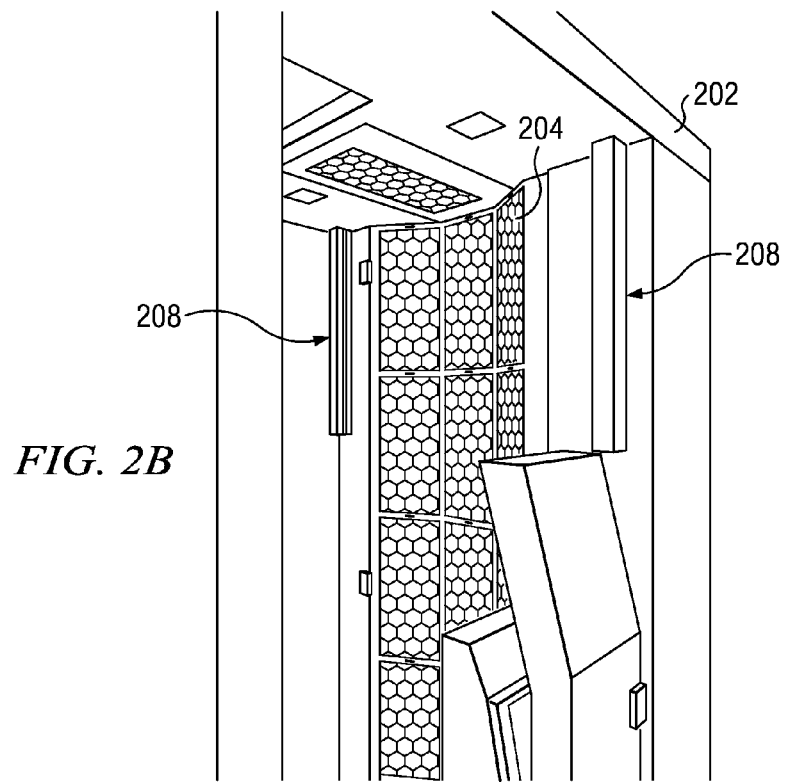
FIG. 2B is a depiction of a portion of an embodiment of the invention disclosed herein, drawing the reader's attention to portions of the automatic height sensing device.

The height sensor (208) is depicted in FIG. 2B. In this embodiment, the height sensor (208) is a multi-beam photosensor device having emitter/receiver pairs positioned such that when a user enters the device (202), he or she interrupts a certain number of beams. The height of each of the beams above the device (202) deck is known beforehand and entered into the height sensor control circuitry. Thus, to determine the approximate height of the user merely requires that the height sensor (208) control circuitry determine the lowest beam that is unbroken (or uninterrupted) by the user, and subtract half the distance between the lowest beam that is unbroken with the highest beam that is broken. This approximate height value may then be utilized in subsequent calculations.

Figure 3:
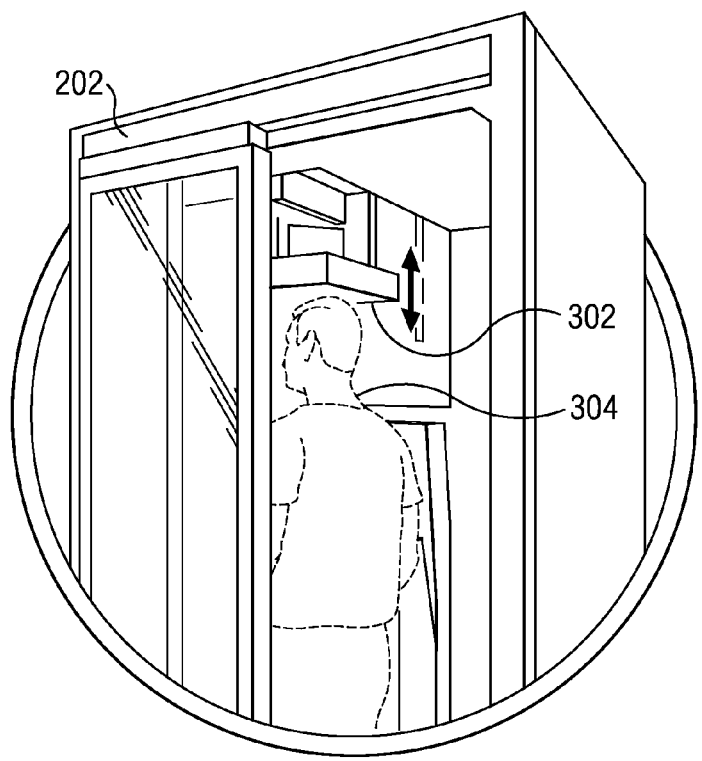
FIG. 3 is a depiction of an alternate means for automatically determining the height of a radiation worker standing therein.

FIG. 3 depicts an alternate means for detecting the height of a user. In this embodiment, the height detector (302) is a moveable radiation detector within the device (202) that is positioned vertically such that it physically contacts the user's head (304) or rests slightly above. The device (202) then automatically determines the height of the user based upon the position of the detector (302) relative to the floor or overhead of the device (202). Movement of the height detector (302) may be through manual or automatic means.

In other embodiments, the height sensor array may utilize the same types of reflective sensing devices as mentioned for the thickness sensor. For example, an ultrasonic sensing device may rely on the time-in-flight method, or an infrared sensing device may rely on reflectivity. Again, one of ordinary skill in the art will understand and appreciate that the operational theory and control design of these and other similar height determination means is well known in the industry and does not serve to limit the scope of the claims herein.

Figure 4:
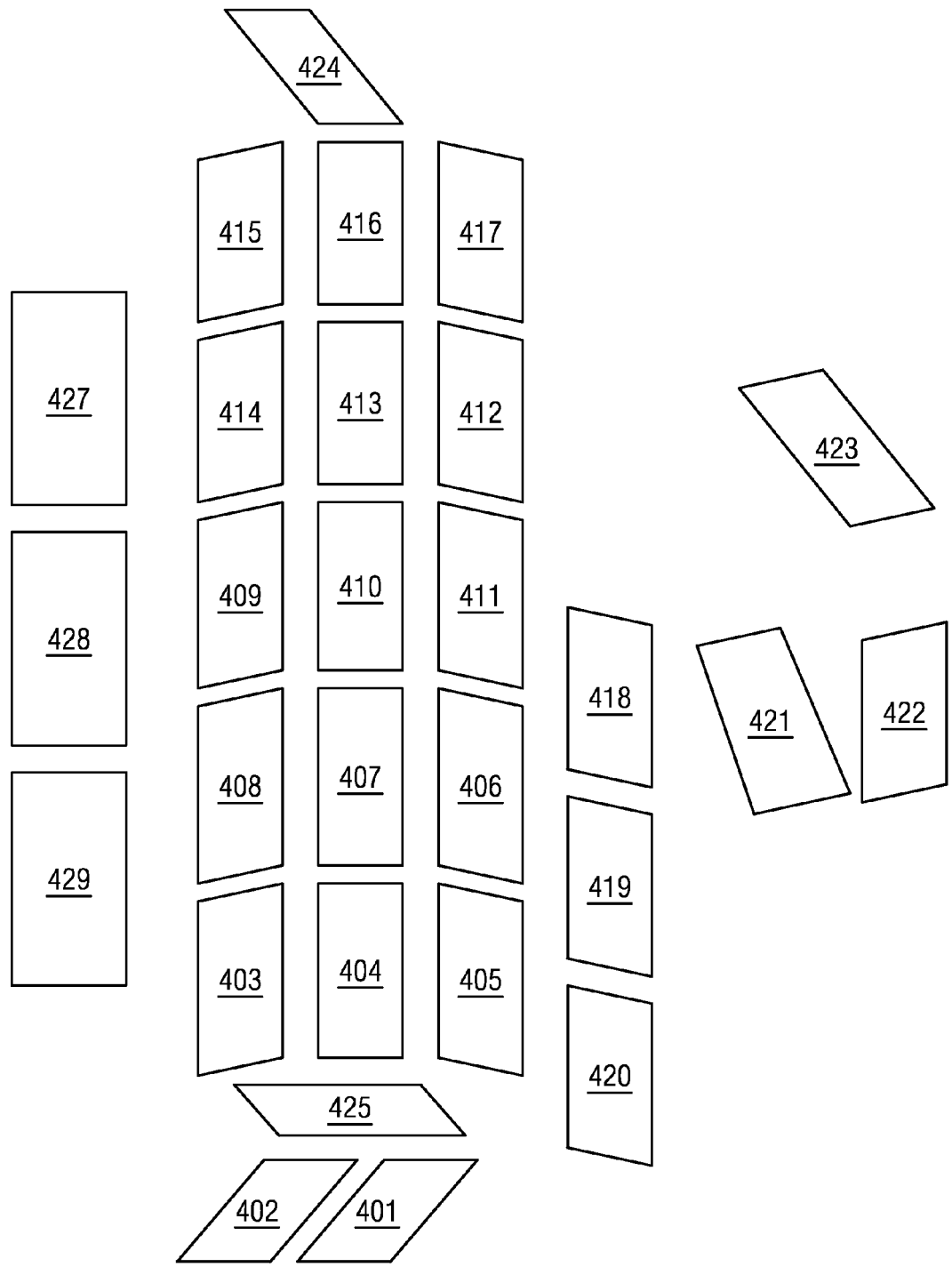
FIG. 4 is a depiction of an ionizing radiation sensor array arrangement as utilized in the embodiment.

FIG. 4 is a depiction of an ionizing radiation sensor array arrangement as utilized by the embodiment. The detector array consists of a combination of well-known alpha/beta (gas), and gamma (scintillation) detectors. The gamma detector panels (427, 428, and 429) are physically located behind the alpha/beta detectors (401 to 425) within the device (202), but are shown in the depiction alongside of the alpha/beta detector array for clarity. In another embodiment, the entire detector array (401 to 425) consists of panels sensitive to beta and gamma radiations. Relevant gamma detectors for this embodiment are (403 to 417). One of ordinary skill in the art will understand and appreciate that the operational theory and detector circuitry design for utilization of these detectors is well known in the industry and does not serve to limit the scope of the claims herein.

In this embodiment, a computing device accepts inputs from the detector device (401 to 429) control circuitry to accept detection events. The computing device also accepts inputs from the aforementioned height and thickness sensors, and utilizes the signals provided by each in subsequent computations related to the self-shielding factor and resulting net count rates. A graphical user interface (GUI) is also provided to assist the operator in running utilities including configuration, calibration, and monitoring routines comprising performance of the method and program steps described herein. Although the embodiment utilizes a single computer device, multiple such devices may be utilized in other embodiments to improve net count rate processing speed or to provide operational redundancy.

Figure 5:
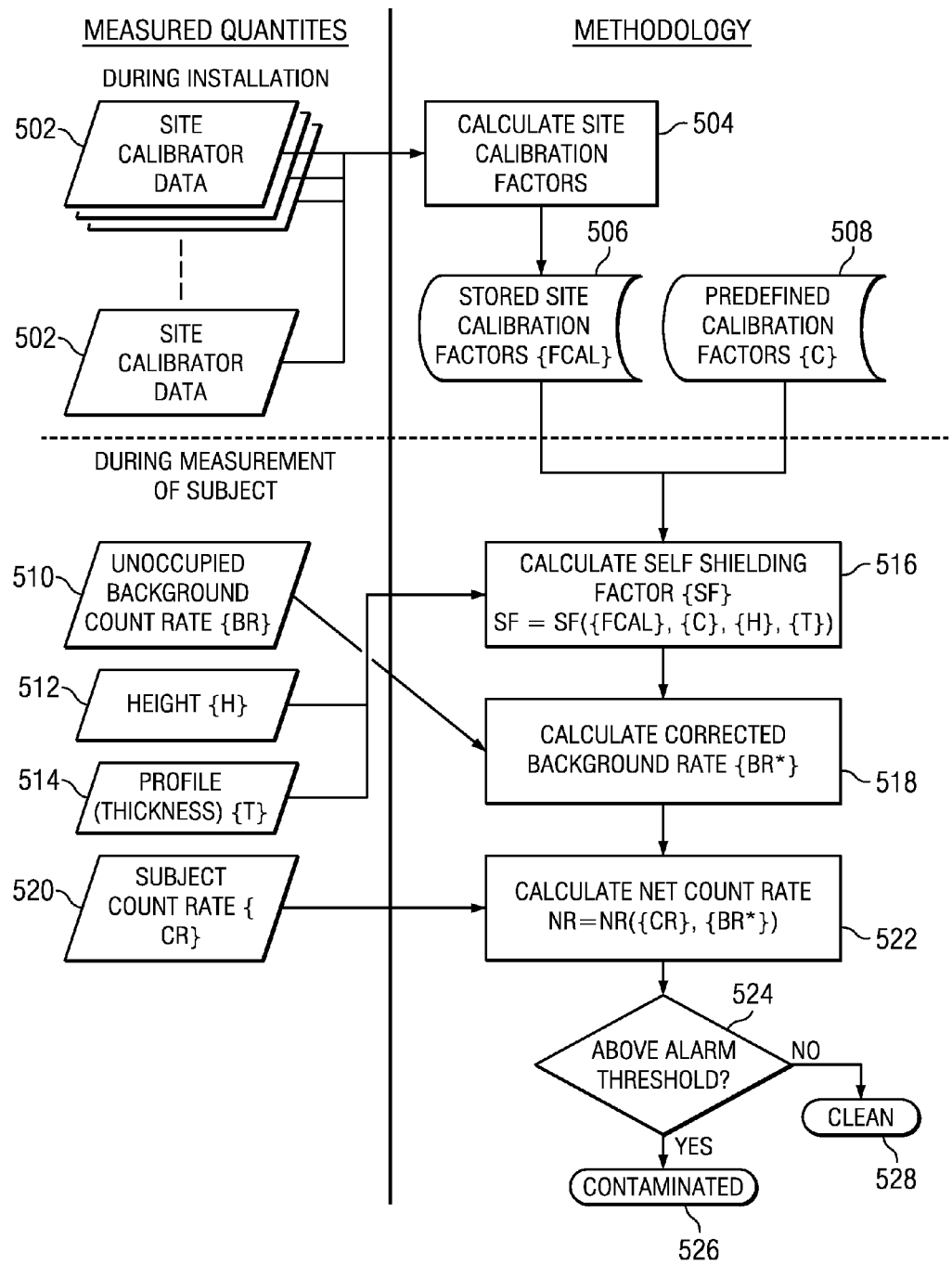
FIG. 5 depicts a flow diagram representing major portions of the method steps performed by the embodiment.

FIG. 5 depicts a flow diagram representing major portions of the method steps performed by the embodiment in calculation of the monitored-subject's net count rate. To begin, when a whole-body surface contamination monitoring device is installed it is necessary to perform an on-site calibration. This is important not only to ensure calibration has not changed from the factory, but to determine background radiation properties at the site of installation. On-site calibration consists of obtaining measurements with the device without users standing therein, and by obtaining measurements with a plurality of users (also called "site calibrators") known to be uncontaminated by radioactive materials.

To begin the initial on-site calibration, a large number of site calibrators (502) are used. Site calibrators (i.e., known uncontaminated workers) representing the population of radiation workers at a particular site are especially useful in calibration because such calibrators more accurately reflect the true makeup of the worker population that will be monitored. Moreover, it is best to utilize the largest number of site calibrators (502) as possible in order to obtain the greatest amount of calibration data from which to work. Thus, a plurality of site calibrators (502) are monitored to obtain self-shielding on-site count data, the site calibration factors are calculated (504) based upon the calibrator data, and the site calibration factors are stored within the system in predetermined bins for subsequent calculations as the $F_{cal}$ value or factor.

Figure 6:
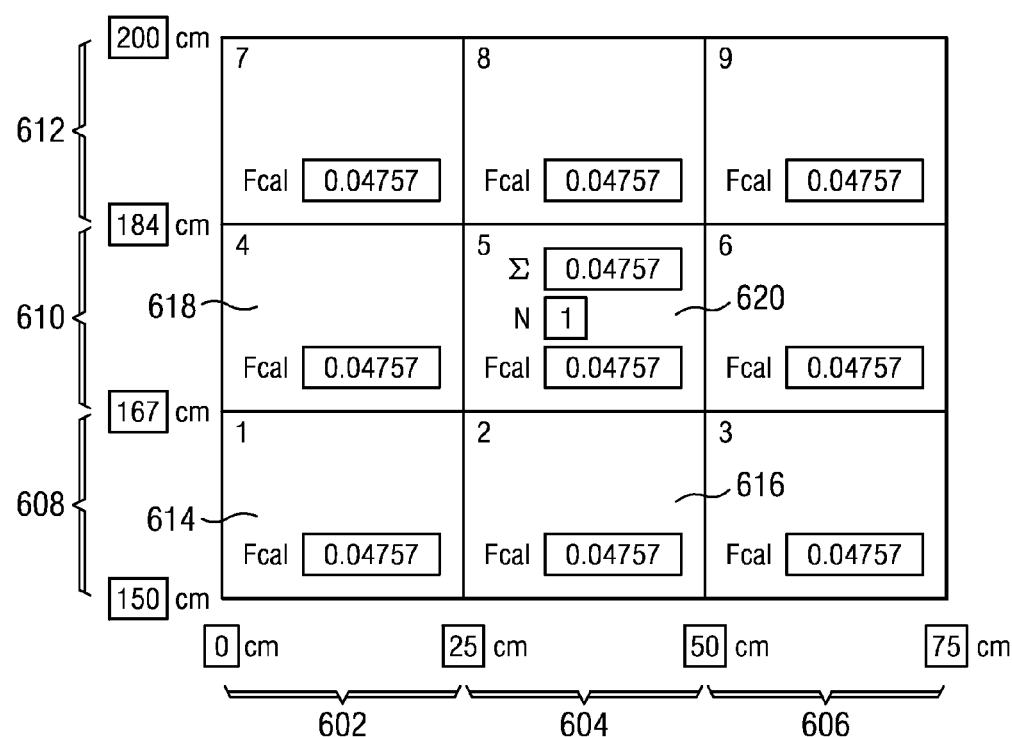
FIG. 6 depicts anthropometric correction Fcal tables as generated by the embodiment.

In the present embodiment, the site calibrator data (502) is initially broken-up into nine height/thickness bins as depicted in FIG. 6. The purpose of the bins is to provide more flexibility to adjust and modify the factory parameters depending on the on-site conditions and population. From this figure, it can be seen that the thickness data has been divided into ranges of 0-25 cm (602), 25-50 cm (604), and 50-75 cm (606). Height has been divided into ranges of 150-167 cm (608), 167-184 cm (610), and 184-200 cm (612). Thus, this creates a 3×3 matrix of nine bins total. For example, using the binning process, site calibrator data obtained from workers that are from 0-25 cm thick and from 150-167 cm tall is used to populate the first bin (614), site calibrator data obtained from workers that are from 25-50 cm thick and from 150-167 cm tall is used to populate the second bin (616), and so on. The bin limits are adjusted to match the actual on-site worker population such that the bins are populated uniformly during calibration and operation.

As the uncontaminated site calibrators are monitored, data are collected regarding the self-shielding that occurs relative to the directly measured background count data. First, the calibrator enters the machine and assumes position 1 (anterior surface toward detector panels) and the first measurement is obtained and an $F_{cal}$ factor for position 1 is computed. Next, the calibrator turns to assume position 2 (posterior surface toward the detector panels) and the second measurement is obtained and an $F_{cal}$ factor for position 2 is computed. These factors are then retained within the appropriate bin. As additional site calibrators are measured, the additional and existing $F_{cal}$ factors are averaged for the particular bin.

In the event that there are no site calibrators for one or more bins; empty bins' receive a global average $F_{cal}$ factor. Next, empty bins with populated neighboring bins (populated by actual site calibrator data) are averaged together and the resulting average is placed within the empty bin. For example, in the present embodiment, if no site calibrator data is available to populate the first bin (614), the first bin (614) receives the global average $F_{cal}$ factor. Next, this global $F_{cal}$ factor is averaged with the $F_{cal}$ factor from neighboring bin 2 (616) and bin 4 (618), and not bin 5 (620). This new average $F_{cal}$ factor is then retained within bin 1 (614) for subsequent measurements. In another embodiment, the diagonal bin (bin 5) is also averaged as a contributing neighbor. Again, the present embodiment utilizes an $F_{cal}$ factor for position 1 and an $F_{cal}$ factor for position 2 within each bin, whereas in another embodiment a single $F_{cal}$ factor might be used for both positions. It should be noted in the example of FIG. 6 that the $F_{cal}$ factors are all identical because only a single calibrator has been measured.

The equation for calculating the $F_{cal}$ factor appears below as Math (1):

$$F_{cal} = \frac{(1 - SSF_{measured})}{(1 - F_{att}(1 - \beta \times e^{-(\alpha \times t)}))} \quad \text{Math (1)}$$

As shown, the $F_{cal}$ factor depends on the attenuation factor ($F_{att}$) and the measured self-shielding factor ($SSF_{measured}$) for the site calibrators as well as certain predefined factory calibration factors. The measured self-shielding factor ($SSF_{measured}$) considers only the measured count rate and the background count rate ($R_B$), and appears as below in Math (2):

$$SSF_{measured} = \frac{R_m}{R_B} \quad \text{Math (2)}$$

The measured count rate ($R_m$) is the count rate measured with the site calibrator in the monitoring device (202).

Referring again to FIG. 5; another important part of the calibration process is the factory calibration data (C factors) that is predefined based upon known and previously measured (empirical value) characteristics of the detectors that are utilized within the device, as well as the control circuitry, geometry of the array, relative location of the detector panels, and the like. The predefined factory calibration factors (508) for the present embodiment are obtained empirically based upon a large data set of uncontaminated calibrators measured during development of the system. One of ordinary skill in the art will understand and appreciate that the actual factory calibration factors are dependent upon the physical hardware and will vary from implementation to implementation, and will know how to obtain such factors for the given system hardware implementation.

As can be seen in the tables, the calibration factors (508) are represented by $\beta$, a, b, c, d, and $h_o$ for specific zones. Each zone may consist of a single numbered detector from the overall array as depicted in FIG. 4, or may consist of a plurality of neighboring detectors. For example, Zone 73 on the table represents a combination of several neighboring detectors. By combining detectors, it is possible to increase the sensitivity of a measurement due to the effectively larger scintillation area provided.

The equation for calculating the attenuation factor ($F_{att}$) is shown below as Math (3):

$$F_{att} = b \times t + c \times t \times (h - n_o) + d \times (h - n_o) \quad \text{Math (3)}$$

As shown, $F_{att}$ utilizes the various factory calibration factors of the tables shown in FIG. 7. This attenuation factor ($F_{att}$) is used in subsequent shielding factor calculations.

Turning again to the flow diagram of FIG. 5, the stored site calibration factors (506) and predefined calibration factors (508) have been obtained as previously described. Next, before a user enters the monitoring device for measurement, the unoccupied background count rate (factor BR) (510) is obtained. A user then enters the monitoring device and the user's height (factor H) (512) and thickness (factor T) (514) values are obtained in a manner as previously described. The height (H) and thickness (T) values are then utilized by the computing device to calculate the self-shielding factor (SF), which is a factor of $F_{cal}$, C, H, and T as shown below in Math (4) and Math (5):

$$SF_{Fb} = 1 - w \cdot f_{cal(p1)} \cdot F_{att} (1 - \beta \times e^{-(\alpha \times t)}) \quad \text{Math (4)}$$

$$SF_F = 1 - w \cdot f_{cal(p2)} \cdot F_{att} (1 - \beta \times e^{-(\alpha \times t)}) \quad \text{Math (5)}$$

Math (4) reflects the calculation with the user in position 1 within the monitoring device while Math (5) reflects the calculation with the user in position 2. The attenuation factor is position independent given that it is based on factory calibration data that is determined by the hardware characteristics. The "w" variable is a user defined weighting variable that allows the monitoring device operator to alter the shielding factors globally, with a single value, with a range typically between 0 and 1. This "w" variable is also considered part of the calibration factors, C (508).

It is also possible to derive a sum zone self-shielding factor by combining neighboring self-shielding factors into an average. This practice is reflected by the equation in Math (6) below:

$$SF_i = \frac{R^i}{R_b^i} = \frac{\Sigma SF_i \cdot R_b^i}{\Sigma R_b^i} \quad \text{Math (6)}$$

As shown, the sum zone self-shielding factor $SF_i$ is a factor of the corrected count rate divided by the measured background count rate ($R_b^i$). For example, the sum zone self-shielding factor for a zone that includes detectors 27 and 28 would be calculated as shown in Math (7) below:

$$SF_{27+28} = \frac{(SSF_{27} \cdot R_b^{27} + SSF_{28} \cdot R_b^{28})}{R_b^{27} + R_b^{28}} \quad \text{Math (7)}$$

Additional detector panels may be added to the sum zone as desired, which increases the overall sensitivity of the resultant sum zone detector.

Once the desired self-shielding factor is calculated, this value is combined with the measured background count rate (510) to compute a corrected background count rate (BR*) (522). The user is then monitored to obtain a subject count rate (CR), which is then combined with the corrected background count rate to calculate a net count rate (NR) (522), which reflects the actual contamination present on the user. If the net count rate (NR) is above a present alarm threshold (524), the user is considered contaminated (526) and an alarm is registered. However, if the net count rate (NR) is not above the alarm threshold, the user is considered clean (528) and no alarm is registered.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be written in any appropriate programming language and delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

The following clauses represent various alternate embodiments of the invention disclosed herein:

Clause 1: A whole-body surface contamination monitoring system, the system comprising: a plurality of gamma radiation detectors, the detectors arranged in a detector array for radioisotope surface-contamination monitoring of at least a portion of the body of a user; and a computing device, the computing device operable to compute a net count rate based upon the output of the gamma radiation detectors, wherein the net count rate calculation includes a self-shielding correction factor that includes a height value and a thickness value, the height value and the thickness value representing physical characteristics of the monitored portion of the body of the user.

Clause 2: The system as in Clause 1 further comprising: at least one device for automatically determining the height value or the thickness value.

Clause 3: The system as in Clause 1 further comprising: at least one device for automatically determining the height value; and at least one device for automatically determining the thickness value.

Clause 4: The system as in Clause 1, wherein the height or thickness values are determined based on automatic measurements from a photosensor device or an ultrasonic sensor device.

Clause 5: The system as in Clause 1, wherein a plurality of thickness values is determined based on automatic measurements from a plurality of photosensor devices or ultrasonic sensor devices such that the plurality of thickness values represents the thicknesses of different areas of the body of the user, and wherein each of the plurality of thickness values is utilized to compute the self-shielding correction factor specific to a given section of the detector array proximate the area of the body represented by the thickness value.

Clause 6: A computerized method of compensating for body self-shielding effects on background radiation counts during whole-body surface contamination monitor system operation, the method steps comprising: with at least one computing device: accepting the outputs from a plurality of gamma radiation detectors arranged in a detector array; accepting a height value and a thickness value, the height value and the thickness value each representing a physical characteristic of the monitored portion of the body of a user; calculating a self-shielding factor, the self-shielding factor including the height value and the thickness value; and calculating a net count rate, the net count rate including the self-shielding factor calculation.

Clause 7: The method of Clause 6, the method steps further comprising: accepting predefinition of a plurality of data bins, wherein each bin represents a different height range and thickness range consistent with the height and thickness values of a plurality of site calibrators; and calculating a measured count rate for each of the on-site calibrators to obtain site calibration factor data, the site calibration factor data assigned to a data bin consistent with the height and thickness of the on-site calibrator, wherein the self-shielding factor calculation includes the site calibration factor data.

Clause 8: The method of Clause 6, the method steps further comprising: accepting predefinition of a plurality of data bins, wherein each bin represents a different height range and thickness range consistent with the height and thickness values of a plurality of site calibrators; calculating a measured count rate for each of the on-site calibrators to obtain initial site calibration factor data, the initial site calibration factor data assigned to a data bin consistent with the height and thickness of the on-site calibrator; and calculating a global average site calibration factor data for assignment to any bin not receiving initial site calibration factor data, wherein the self-shielding factor calculation includes the initial site calibration factor data and the global average site calibration factor data.

Clause 9: The method of Clause 6, the method steps further comprising: accepting predefinition of a plurality of data bins, wherein each bin represents a different height range and thickness range consistent with the height and thickness values of a plurality of site calibrators; calculating a measured count rate for each of the on-site calibrators to obtain initial site calibration factor data, the initial site calibration factor data assigned to a data bin consistent with the height and thickness of the on-site calibrator; calculating a global average site calibration factor data for assignment to any bin not receiving initial site calibration factor data; and calculating a final average site calibration factor data for each bin not receiving initial site calibration factor data, wherein the final average site calibration factor data includes the global average site calibration factor data and the neighboring initial site calibration factor data, and wherein the self-shielding factor calculation includes the initial site calibration factor data and the final average site calibration factor data.

Clause 10: The method of Clause 6, the method steps further comprising: combining two or more gamma radiation detectors to create a sum zone.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. A whole-body surface contamination monitoring system, the system comprising:

a plurality of gamma radiation detectors, the detectors arranged in a detector array for radioisotope surface-contamination monitoring of at least a portion of the body of a user; and a computing device, the computing device operable to compute a net count rate based upon the output of the gamma radiation detectors, wherein the net count rate calculation includes a self-shielding correction factor that corrects for shielding of background radiation by the body of the user and includes a height value and a thickness value, the height value and the thickness value representing physical characteristics of the monitored portion of the body of the user.

2. The system of claim 1, the system further comprising:
at least one device for automatically determining the height value or the thickness value.

3. The system of claim 1, the system further comprising:
at least one device for automatically determining the height value; and
at least one device for automatically determining the thickness value.

4. The system of claim 1, wherein the height or thickness values are determined based on automatic measurements from a photosensor device or an ultrasonic sensor device.

5. The system of claim 1, wherein a plurality of thickness values is determined based on automatic measurements from a plurality of photosensor devices or ultrasonic sensor devices such that the plurality of thickness values represents the thicknesses of different areas of the body of the user, and wherein each of the plurality of thickness values is utilized to compute the self-shielding correction factor specific to a given section of the detector array proximate the area of the body represented by the thickness value.

6. A computerized method of compensating for body self-shielding effects on background radiation counts during whole-body surface contamination monitor system operation, the method steps comprising:
with at least one computing device:
accepting the outputs from a plurality of gamma radiation detectors arranged in a detector array;
accepting a height value and a thickness value, the height value and the thickness value each representing a physical characteristic of the monitored portion of the body of a user;
calculating a self-shielding factor, the self-shielding factor correcting for shielding of background radiation by the body of the user and including the height value and the thickness value; and
calculating a net count rate, the net count rate including the self-shielding factor calculation.

7. The method of claim 6, the method steps further comprising:
combining two or more gamma radiation detectors to create a sum zone.

8. A computerized method of compensating for body self-shielding effects on background radiation counts during whole-body surface contamination monitor system operation, the method steps comprising:
with at least one computing device:
accepting the outputs from a plurality of gamma radiation detectors arranged in a detector array;
accepting a height value and a thickness value, the height value and the thickness value each representing a physical characteristic of the monitored portion of the body of a user;
calculating a self-shielding factor, the self-shielding factor correcting for shielding of background radiation by the body of the user and including the height value and the thickness value;
calculating a net count rate, the net count rate including the self-shielding factor calculation;
accepting predefinition of a plurality of data bins, wherein each bin represents a different height range and thickness range consistent with the height and thickness values of a plurality of site calibrators; and
calculating a measured count rate for each of the on-site calibrators to obtain site calibration factor data, the site calibration factor data assigned to a data bin consistent with the height and thickness of the on-site calibrator, wherein the self-shielding factor calculation includes the site calibration factor data.

9. A computerized method of compensating for body self-shielding effects on background radiation counts during whole-body surface contamination monitor system operation, the method steps comprising:
with at least one computing device:
accepting the outputs from a plurality of gamma radiation detectors arranged in a detector array;
accepting a height value and a thickness value, the height value and the thickness value each representing a physical characteristic of the monitored portion of the body of a user;
calculating a self-shielding factor, the self-shielding factor correcting for shielding of background radiation by the body of the user and including the height value and the thickness value;
calculating a net count rate, the net count rate including the self-shielding factor calculation;
accepting predefinition of a plurality of data bins, wherein each bin represents a different height range and thickness range consistent with the height and thickness values of a plurality of site calibrators;
calculating a measured count rate for each of the on-site calibrators to obtain initial site calibration factor data, the initial site calibration factor data assigned to a data bin consistent with the height and thickness of the on-site calibrator; and
calculating a global average site calibration factor data for assignment to any bin not receiving initial site calibration factor data, wherein the self-shielding factor calculation includes the initial site calibration factor data and the global average site calibration factor data.

10. A computerized method of compensating for body self-shielding effects on background radiation counts during whole-body surface contamination monitor system operation, the method steps comprising:
with at least one computing device:
accepting the outputs from a plurality of gamma radiation detectors arranged in a detector array;
accepting a height value and a thickness value, the height value and the thickness value each representing a physical characteristic of the monitored portion of the body of a user;
calculating a self-shielding factor, the self-shielding factor correcting for shielding of background radiation by the body of the user and including the height value and the thickness value;
calculating a net count rate, the net count rate including the self-shielding factor calculation;
accepting predefinition of a plurality of data bins, wherein each bin represents a different height range and thickness range consistent with the height and thickness values of a plurality of site calibrators;

calculating a measured count rate for each of the on-site calibrators to obtain initial site calibration factor data, the initial site calibration factor data assigned to a data bin consistent with the height and thickness of the on-site calibrator;

calculating a global average site calibration factor data for assignment to any bin not receiving initial site calibration factor data; and calculating a final average site calibration factor data for each bin not receiving initial site calibration factor data, wherein the final average site calibration factor data includes the global average site calibration factor data and the neighboring initial site calibration factor data, and wherein the self-shielding factor calculation includes the initial site calibration factor data and the final average site calibration factor data.

* * * * *